May 29, 1951     W. A. DRAUGHN     2,555,226

CLAMP

Filed Dec. 23, 1946

Inventor
W. A. Draughn
By *Knowles*
Attorneys

Patented May 29, 1951

2,555,226

UNITED STATES PATENT OFFICE 2,555,226

CLAMP

Wyatt A. Draughn, Hattiesburg, Miss.

Application December 23, 1946, Serial No. 718,053

1 Claim. (Cl. 287—14)

This invention relates to clamps designed for use in connection with broom handles, the primary object of the invention being to provide a clamp for clamping the sections of a broom handle together, in such a way that the main handle section may be disposed at an angle with respect to the broom head, to facilitate the use of the broom, by persons of various heights.

Another object of the invention is to provide means for adjusting the broom handle with respect to the broom, so that the broom head may be used as a wall brush, if so desired.

Still another important object of the invention is to provide clamping means for clamping the sections of a broom handle together, the clamping means being of an adjustable character, so that broom handles of various sizes may be gripped by the clamp.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1:
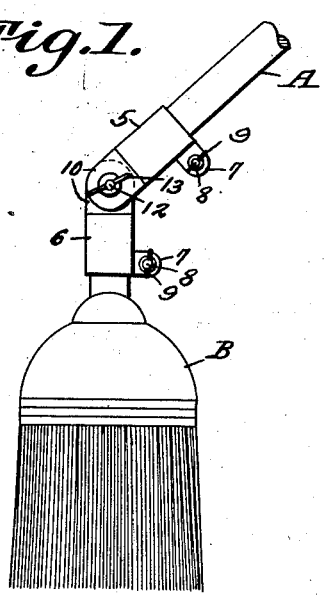
Figure 1 is an elevational view illustrating a broom handle equipped with a clamping means, constructed in accordance with the invention.
Figure 2:
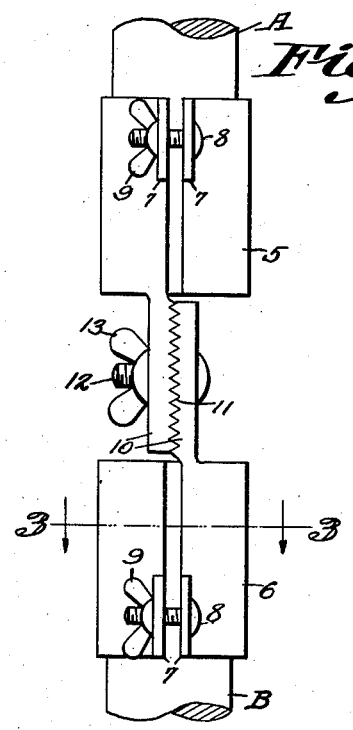
Figure 2 is a front elevational view thereof.

Referring to the drawing in detail, the clamp embodies a pair of split sleeves 5 and 6, each sleeve being formed with laterally extended apertured ears 7 that accommodate the bolt 8 which is supplied with a wing nut 9, whereby the split sleeves may be secured to the broom handle section with which it is used.

As clearly shown by Figure 1 of the drawing, a head 10 extends from each sleeve, the heads being formed with teeth 11, the teeth of the heads cooperating in holding the split sleeves in their positions of adjustment.

These heads are formed with registering openings to receive the bolt 12 which is provided with a winged nut 13 for drawing the heads 10 together in adjusted relation with respect to each other.

Figure 4:
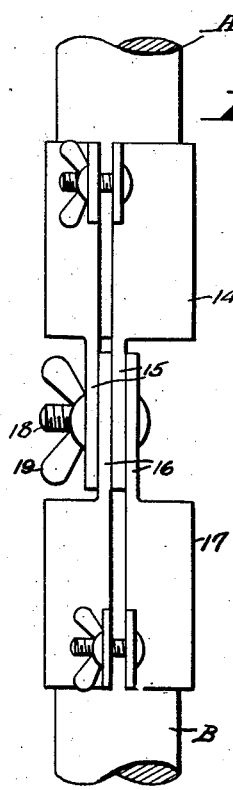
Figure 4 is an elevational view of a modified form of clamp.
Figure 3:
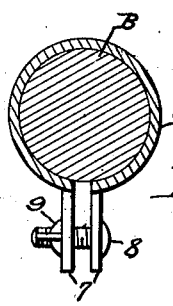
Figure 3 is a sectional view taken on line 3—3 of Figure 2.

In the form of the invention as shown by Figure 4 of the drawing, the split sleeve 14 is provided with ears 15 that are extended from one end of the sleeve at opposite sides of the split portion, the ears 15 cooperating with the ears 16 of the sleeve 17 in securing the sleeves 14 and 17 together. As shown by Figure 4, these ears are disposed in overlapped relation with respect to each other and are provided with aligning openings for the reception of the bolt 18 on which the winged nut 19 is mounted.

From the foregoing, it will be seen that due to the construction shown and described, the sleeves 14 and 17, as well as the sleeves 5 and 6 of the preferred form of the invention, may be adjusted with respect to each other to support the main portion of the handle, which in the present showing is indicated by the reference character A, at various angular positions with respect to the broom head, indicated by the reference character B.

By adjusting the main portion of the handle, the sweeping ends of the bristles of the broom will be moved along the surface being swept, in perpendicular relation with the surface, thereby reducing wear on the broom to a minimum, and providing a broom which may be converted from an ordinary sweeping broom to a wall broom wherein the head is usually supported at right angles with respect to the main portion of the handle.

What is claimed is:

A broom handle clamp embodying split sleeves adapted to be clamped around a broom handle, ears extending from one end of each sleeve at opposite sides of the split portion thereof, an ear of one sleeve being clamped between the ears of the adjacent sleeve, said ears having aligning openings, a bolt extending through the aligning openings of said ears clamping the ears together in adjusted relation with respect to each other, and ears formed on the sleeves at the opposite sides of the split portion at the opposite ends of the sleeves, and bolts extending through the latter ears clamping the split sleeves to handle sections.

WYATT A. DRAUGHN.

REFERENCES CITED

The following references are of record in the file of this patent:

UNITED STATES PATENTS

| Number | Name | Date |
|---|---|---|
| 509,884 | Faber | Dec. 5, 1893 |
| 628,897 | Schrader | July 11, 1899 |
| 809,432 | Darrschmidt | Jan. 9, 1906 |
| 1,268,734 | Lay | June 4, 1918 |
| 1,301,475 | Mellin | Apr. 22, 1919 |
| 2,174,459 | Borsetti | Sept. 26, 1939 |

FOREIGN PATENTS

| Number | Country | Date |
|---|---|---|
| 359,459 | Great Britian | Oct. 19, 1931 |
| 186,803 | Great Britain | Oct. 12, 1922 |